(12) United States Patent
Ryder et al.

(10) Patent No.: US 7,578,246 B2
(45) Date of Patent: Aug. 25, 2009

(54) PRECISION HOE OPENER WITH DRAFT FORCE COMPENSATION

(75) Inventors: Nicholas George Alfred Ryder, Saskatoon (CA); Gerard James Gadzella, Saskatoon (CA)

(73) Assignee: CNH Canada, Ltd. (CA)

( * ) Notice: Subject to any disclaimer, the term of this patent is extended or adjusted under 35 U.S.C. 154(b) by 0 days.

(21) Appl. No.: 12/141,908

(22) Filed: Jun. 18, 2008

(65) Prior Publication Data

US 2008/0308023 A1 Dec. 18, 2008

Related U.S. Application Data

(60) Provisional application No. 60/944,790, filed on Jun. 18, 2007.

(51) Int. Cl.
- *A01B 49/04* (2006.01)
- *A01C 5/00* (2006.01)
- *A01C 13/00* (2006.01)
- *B21D 53/60* (2006.01)
- *B21K 19/00* (2006.01)

(52) U.S. Cl. .................. 111/136; 111/156; 111/194; 111/900; 29/891

(58) Field of Classification Search .............. 172/1, 172/138, 141, 174–176, 179, 195–197, 199, 172/200, 238–244, 260.5, 261–268, 297–299, 172/303, 304, 307–310, 315–322, 332–337, 172/395, 407–421, 452–507, 605, 663–684.5, 172/734–744, 776; 111/194, 196, 190, 191, 111/52–62, 149, 151–156, 120–126, 200, 111/900, 134–137; 29/891

See application file for complete search history.

(56) References Cited

U.S. PATENT DOCUMENTS

| | | | |
|---|---|---|---|
| 1,931,783 | A | 10/1933 | Wickes |
| 2,627,797 | A | 2/1953 | Acton |
| 2,818,269 | A | 12/1957 | Northcote et al. |
| 2,839,851 | A | 6/1958 | Geiszler |

(Continued)

FOREIGN PATENT DOCUMENTS

| AU | 58706/86 | 12/1986 |
|---|---|---|
| FR | 2630286 | 10/1989 |

OTHER PUBLICATIONS

U.S. Appl. No. 12/141,881, filed Jun. 18, 2008; Applicants: Jim Henry et al.; Entitled: "Precision Hoe Opener and Packer Wheel Assembly".

(Continued)

*Primary Examiner*—Christopher J. Novosad
(74) *Attorney, Agent, or Firm*—Rebecca Henkel

(57) ABSTRACT

A precision hoe opener assembly is provided with improved accuracy of seeding as well as improved control over the opener and packer wheel assemblies. The opener assembly includes a hydraulically-driven parallel linkage assembly, a swing link, a ground engaging tool, and a packer wheel. The design provides improved seeding accuracy, by compensating for changes in draft force caused by changes in terrain elevation. The swing link allows the cylinder to compensate for the forces applied to the ground engaging tool, thereby providing a substantially constant packing force to the soil beneath the packing wheel.

15 Claims, 9 Drawing Sheets

U.S. PATENT DOCUMENTS

| | | |
|---|---|---|
| 3,599,728 A | 8/1971 | Moe et al. |
| 4,326,594 A | 4/1982 | Oka et al. |
| 4,580,507 A | 4/1986 | Dreyer et al. |
| 4,694,759 A | 9/1987 | Dreyer et al. |
| 4,721,048 A | 1/1988 | Fuss et al. |
| 4,759,301 A | 7/1988 | Thomas |
| 5,031,550 A | 7/1991 | Neal |
| 5,161,472 A | 11/1992 | Handy |
| 5,234,060 A | 8/1993 | Carter |
| 5,351,635 A | 10/1994 | Hulicsko |
| 5,396,851 A | 3/1995 | Beaujot |
| 5,855,245 A | 1/1999 | Gerein |
| 6,032,593 A | 3/2000 | Wendling et al. |
| 6,142,085 A | 11/2000 | Drever et al. |
| 6,986,313 B2 | 1/2006 | Halford et al. |
| 7,104,205 B2 | 9/2006 | Beaujot |
| 7,152,539 B2 | 12/2006 | Swanson |
| 7,159,523 B2 | 1/2007 | Bourgault et al. |
| 7,168,376 B2 | 1/2007 | Johnston |
| 7,261,048 B1 | 8/2007 | Hantke |
| 2007/0245938 A1 | 10/2007 | Bourgault et al. |
| 2008/0029002 A1 | 2/2008 | Sulman |
| 2008/0308024 A1 | 12/2008 | Lung et al. |

OTHER PUBLICATIONS

U.S. Appl. No. 12/141,891, filed Jun. 18, 2008; Applicants: Nicholas George Alfred Ryder et al.; Entitled: "Precision Hoe Opener with Swing Link Between Cylinder Shank".

U.S. Appl. No. 12/141,895, filed Jun. 18, 2008; Applicants: Nicholas George Alfred Ryder et al.; Entitled: "Precision Hoe Opener Assembly with Swing Link and Biasing Member".

U.S. Appl. No. 12/141,904, filed Jun. 18, 2008; Applicants: Nicholas George Alfred Ryder et al.; Entitled: "Precision Hoe Opener Assembly with Adjustable Packer Wheel Location".

Voichinskii, S.M.; Agricultural Implement depth controller; Derwent Abstract Accession No. B4505B/07, Class P11, SU 599755 A (Minsk Tractor Wks) Apr. 19, 1978; abstract drawings.

PRECISION HOE OPENER WITH DRAFT FORCE COMPENSATION

RELATED APPLICATION

This application benefits from the priority of U.S. Provisional Patent Application No. 60/944,790, entitled "Precision Hoe Opener Assembly with Swing Link and Biasing Member," filed Jun. 18, 2007, which is hereby incorporated by reference in its entirety.

BACKGROUND

The invention relates to agricultural seeders, such as hoe openers and seeding tools used in farming operations to distribute seeds into a soil.

Generally, precision hoe openers are mounted to the frame of an implement which is towed behind a tractor. These openers may include an ground engaging tool that opens the soil, providing a path for seed deposition into the soil. The ground engaging tool is used to break the soil to enable seed deposition. After the seed is deposited, the ground engaging tool may be followed by a packer wheel that packs the soil on top of the deposited seed. The packer wheel may be rigidly mounted behind the opener via a structural member or rear frame. Thus, the ground engaging tool and packer wheel generally move together with the same upward and downward motion. This vertical motion, somewhat independent of the implement frame, allows for more precise placement of seed in the soil.

Unfortunately, existing precision hoe openers do not adequately address the need for height variation over terrain during seeding, or for transportation when not seeding. It is generally undesirable to pull the hoe opener through soil when merely transporting the opener from one location to another. In addition, during seeding, existing openers do not provide adequate vertical motion of the opener and related assembly without compromising the load on the ground engaging tool and packer wheel. As a result, variations in the terrain can result in drastic changes in the packing force (e.g., normal force) of the packer wheel on the terrain being seeded by the opener and, also, the draft force of the terrain on the ground engaging tool. In turn, this variation in grounding opening force and packing force can result in non-uniform seeding depths and packing density in the terrain being seeded.

For instance, some existing openers may employ a parallel linkage to control the location of the packer wheel and ground engaging tool. One of the difficulties in using a parallel linkage is that the force at the packer wheel will fluctuate as the parallel linkage changes orientation relative to the direction of the application of the draft force applied to the ground engaging tool. Moreover, the factors discussed above cause inconsistent forces to be applied to the packer wheel, which leads to variations in seeding depth and quality.

There is a need, therefore, for improved arrangements in precision hoe openers that improve the accuracy of the seeding operation. There is a particular need for a precision hoe opener configuration that maintains substantially constant forces on the packing wheel to improve seeding depth, accuracy and quality.

BRIEF DESCRIPTION

Embodiments of the present invention address the problem of inconsistent forces applied to the ground engaging tool and wheel assemblies by optimizing the geometric relationship of the linear actuator, parallel linkage, ground engaging tool, and packer wheel. Specifically, embodiments of the present invention allow for additional motion between the shank and cylinder by incorporating a swing link assembly between these elements. The swing link enables the linear actuator, such as a cylinder, to travel farther than if it were rigidly mounted to the shank providing for both additional vertical motion of the assembly, as well as providing the desired loading on the ground engaging tool and packer wheel.

The swing link further allows the cylinder to compensate for the forces applied to the ground engaging tool, thereby providing a substantially constant packing force to the soil beneath the packing wheel. For example, embodiments of the present invention include draft compensation in the parallel linkage to counteract effects of draft forces placed on the ground engaging tool on the packing force during operation. Embodiments of the present invention are configured to enable the hydraulic load of the cylinder to compensate and counteract the varying draft loads on the ground engaging tool, resulting in a substantially constant packing pressure on the packer wheel and enhanced seeding accuracy.

Various refinements exist of the features noted above in relation to the various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of the present invention without limitation to subject matter set forth in claims.

DRAWINGS

These and other features, aspects, and advantages of the present invention will become better understood when the following detailed description is read with reference to the accompanying drawings in which like characters represent like parts throughout the drawings, wherein.

Figure 8B:
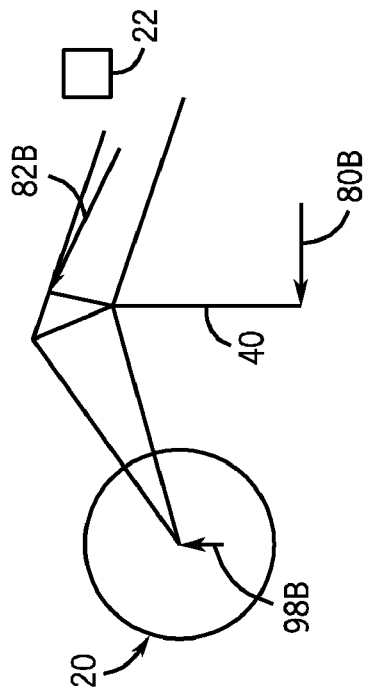
Figure 8A:
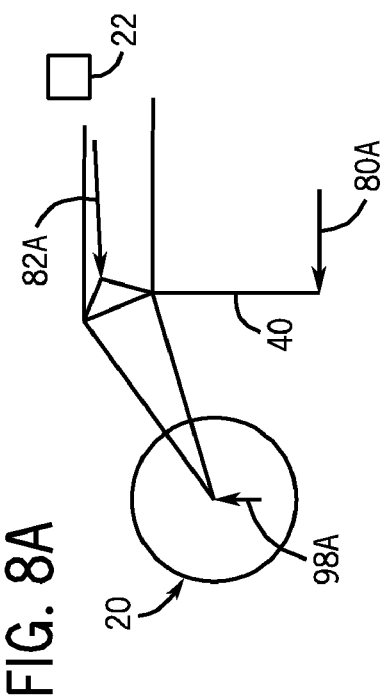
Figure 8C:
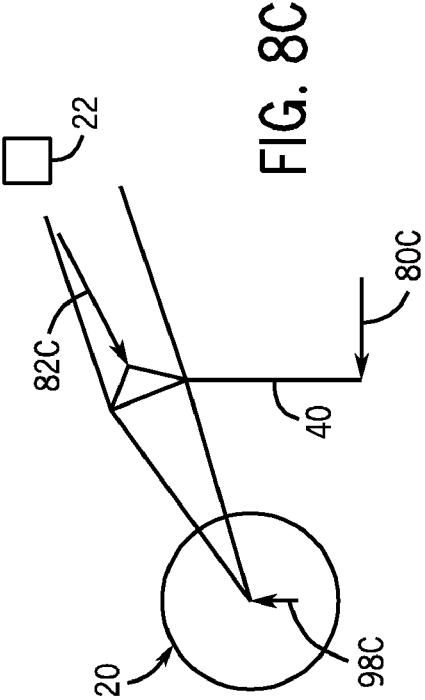
Figure 9:
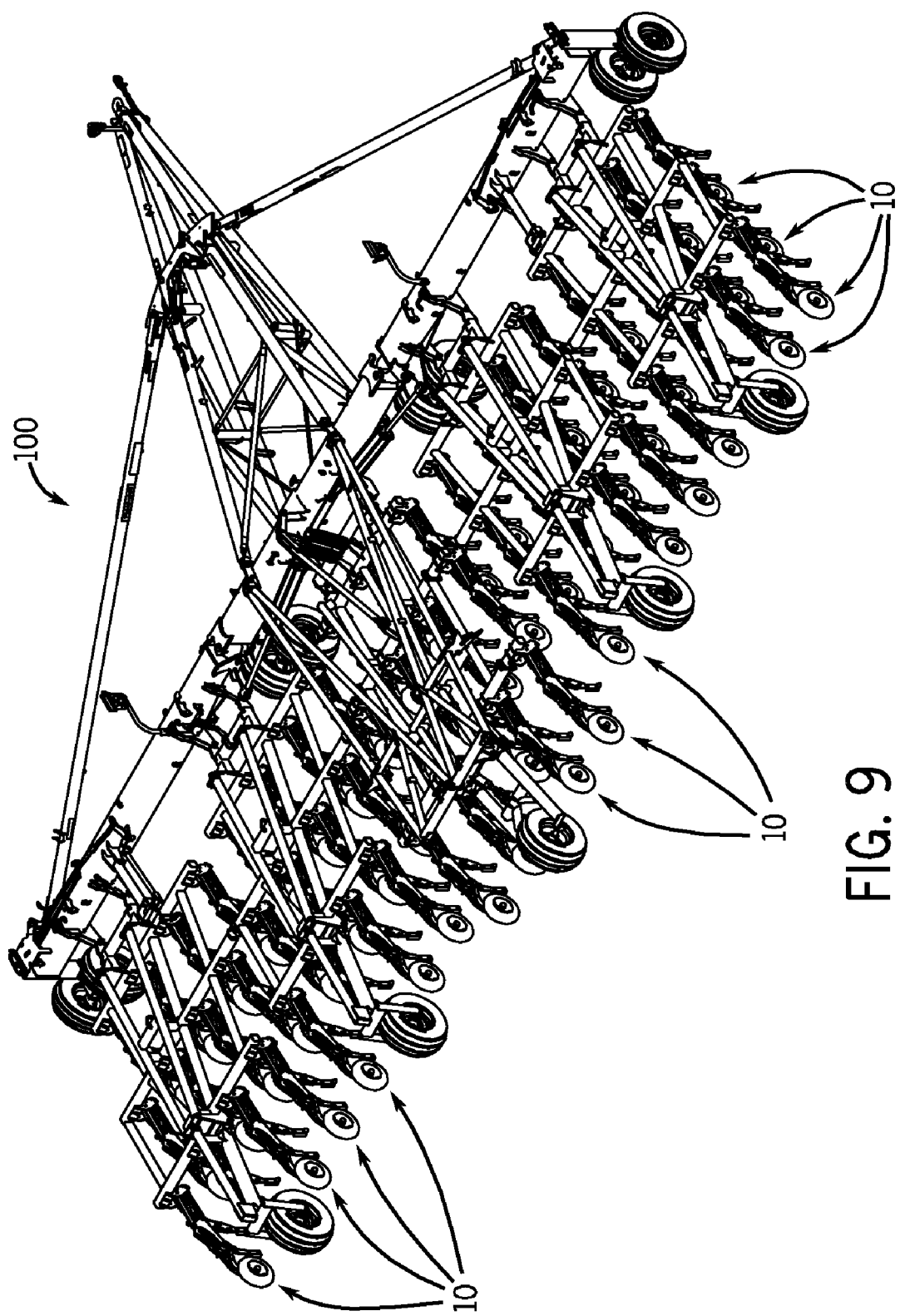

FIGS. 8A, 8B, and 8C are simplified diagrams of the opener assembly and the forces acting thereon in three different positions; and FIG. 9 is a perspective view of an entire seeder assembly system, including multiple opener assemblies and the tool bars that they are attached thereto.

DETAILED DESCRIPTION

Figure 1:
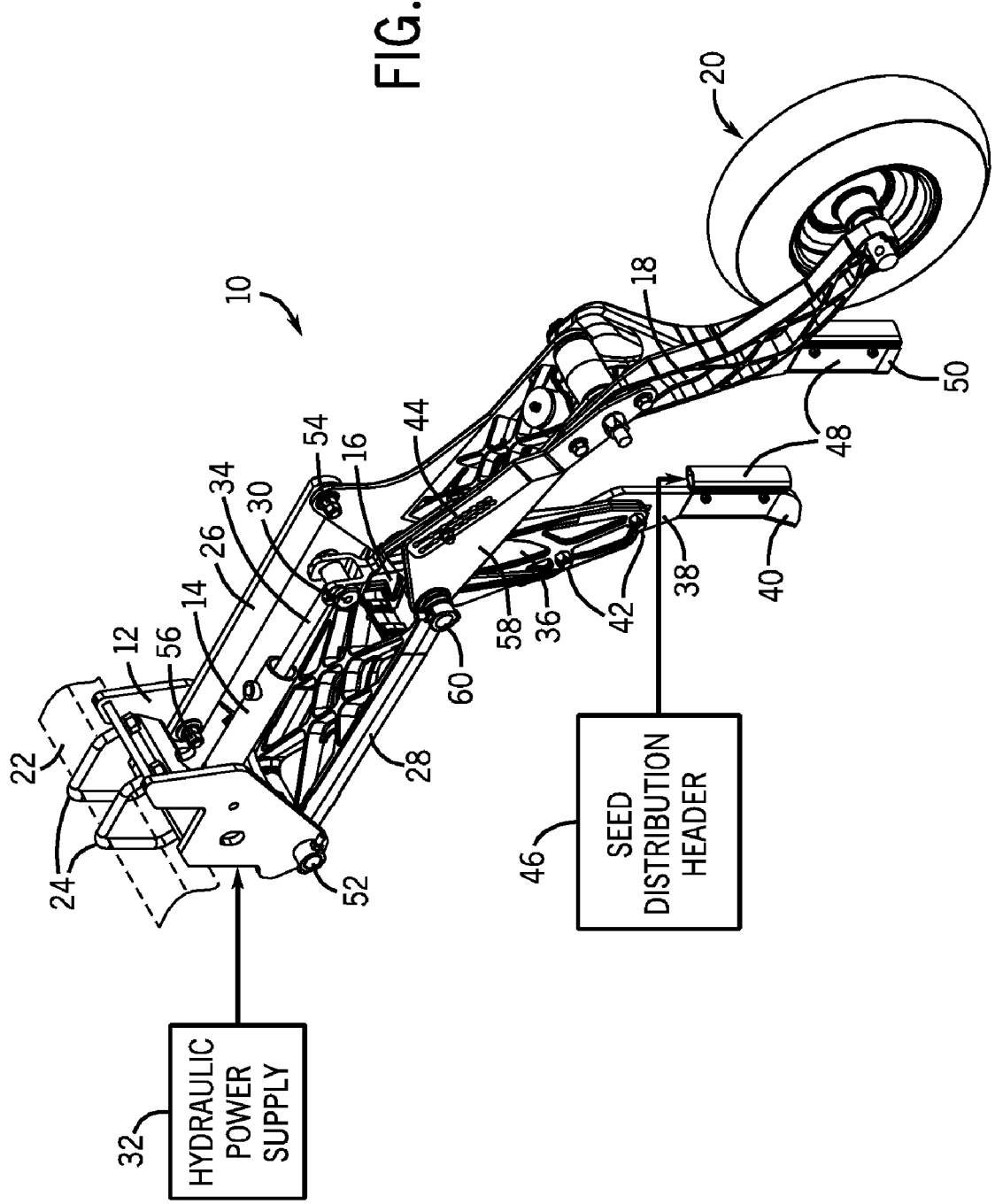
FIG. 1 is a perspective view of an embodiment of a precision hoe opener having a frame support, a cylinder, a swing link assembly, a rear frame assembly, a ground engaging tool, and a packer wheel.

Turning now to the drawings and referring first to FIG. 1, an embodiment of a precision hoe opener assembly is illustrated and designated generally by reference numeral 10. In the embodiment, precision opener assembly 10 includes a frame support 12, a biasing member such as a linear actuator or cylinder 14 (e.g., a hydraulic, piston-driven assembly), a swing link assembly 16, a packer wheel assembly 18 (e.g., a packer arm), and a packer wheel 20. Precision hoe opener assembly 10 may be towed, pushed, or generally moved by a vehicle, such as a tractor (not shown). For example, the frame support 12 may be connected to tool frame tow bar 22 attached to the tractor for towing the precision hoe opener assembly 10. The tool frame tow bar 22 is a component of the frame of an seeder assembly system as will be described in FIG. 9. The precision hoe opener assembly 10 is mounted to the tractor support via mounting brackets 24. In the present context, the precision hoe opener assembly 10 may also be referred to as an opener assembly, a hoe opener, a row unit, a planter, a seeder, an opener or a ground engaging tool/assembly. Further, the ground engaging tool or opener is the portion of the hoe opener assembly that contacts the ground, thereby preparing the soil for seed deposition.

Tool frame support 12 is connected to the swing link assembly 16 of rear frame assembly 58 via the cylinder 14, first member 26, and second member 28. In some embodiments cylinder 14 may be replaced by a suitable one way or two way biasing member. For example, a spring may be used, thereby acting as a one way biasing member to exert force in one direction. In the present embodiment the cylinder 14 acts as a two way biasing member, meaning the cylinder 14 is capable of exerting force on components in two directions. As depicted, the cylinder 14 may be driven by a fluid (e.g., hydraulic) or a gas (e.g., pneumatic). The mounting configuration of cylinder 14, first member 26, and second member 28 will be discussed further below. Cylinder 14 is mounted to swing link assembly 16 via pin 30. Cylinder 14 is hydraulically coupled to a power supply 32 that may be used to pressurize piston rod 34 to actuate the swing link assembly 16. Once actuated, swing link assembly 16 may engage rear frame assembly 58 via a stop as will be described further below. The swing link assembly 16 engages the packer wheel assembly 18 via a shank mount adapter 36 and rear frame 58. The shank mount adapter 36 is coupled to a shank 38 and a first ground engaging tool 40. Shank mount adapter 36 may be coupled to shank 38 via fasteners 42, which allow height adjustments for ground engaging tool 40. Packer wheel assembly adjustments can also be made via adjuster 44. First ground engaging tool 40 is coupled to a seed distribution header 46 via a seeding tube 48 to allow product deposition during operation. The present embodiment illustrates an optional second ground engaging tool 50, which may be added in some cases to allow for a second product to be placed in the ground. The adjustments enabled by fasteners 42 and adjuster 44 may optimize product placement accuracy by allowing packer wheel 20 to move vertically with respect to first opener 40 and second opener 50. Moreover, the optional second ground engaging tool may affect the packing forces and/or compensation of the system, but likely not significantly alter the basic design of the precision hoe opener assembly and swing link mechanism.

The diagram also shows first member 26 attached via pins 54 and 56 to tool frame support 12, and rear frame 58. Second member 28 is also connected to rear frame 58 and tool frame support 12 via pins 60 and 52. Further, pins 60 and 54 couple rear frame 58 to shank mount adapter 36 as well as second member 28. The elements 12, 26, 28, and 58 may be collectively described as a hydraulically-driven four-bar linkage or parallel linkage assembly. As depicted, cylinder 14 drives movement of the parallel linkage assembly.

As discussed above, cylinder 14 actuates swing link assembly 16 to load shank adapter 36 and shank 38, which further loads rear frame assembly 58 and packer wheel assembly 18 and packer wheel 20. In certain embodiments, the packer wheel 20 provides a substantially constant force to the soil after the seed has been deposited. As is commonly known in the art, packer wheel 20 is coupled to packer wheel assembly 18 via a rotating bearing. Further, packer wheel assembly 18 includes multiple mounting locations on adjuster 44 to allow for adjustment of the position of packer wheel 20. As stated above, seeding accuracy may be enhanced by adjusting the position of packer wheel 20.

Figure 2:
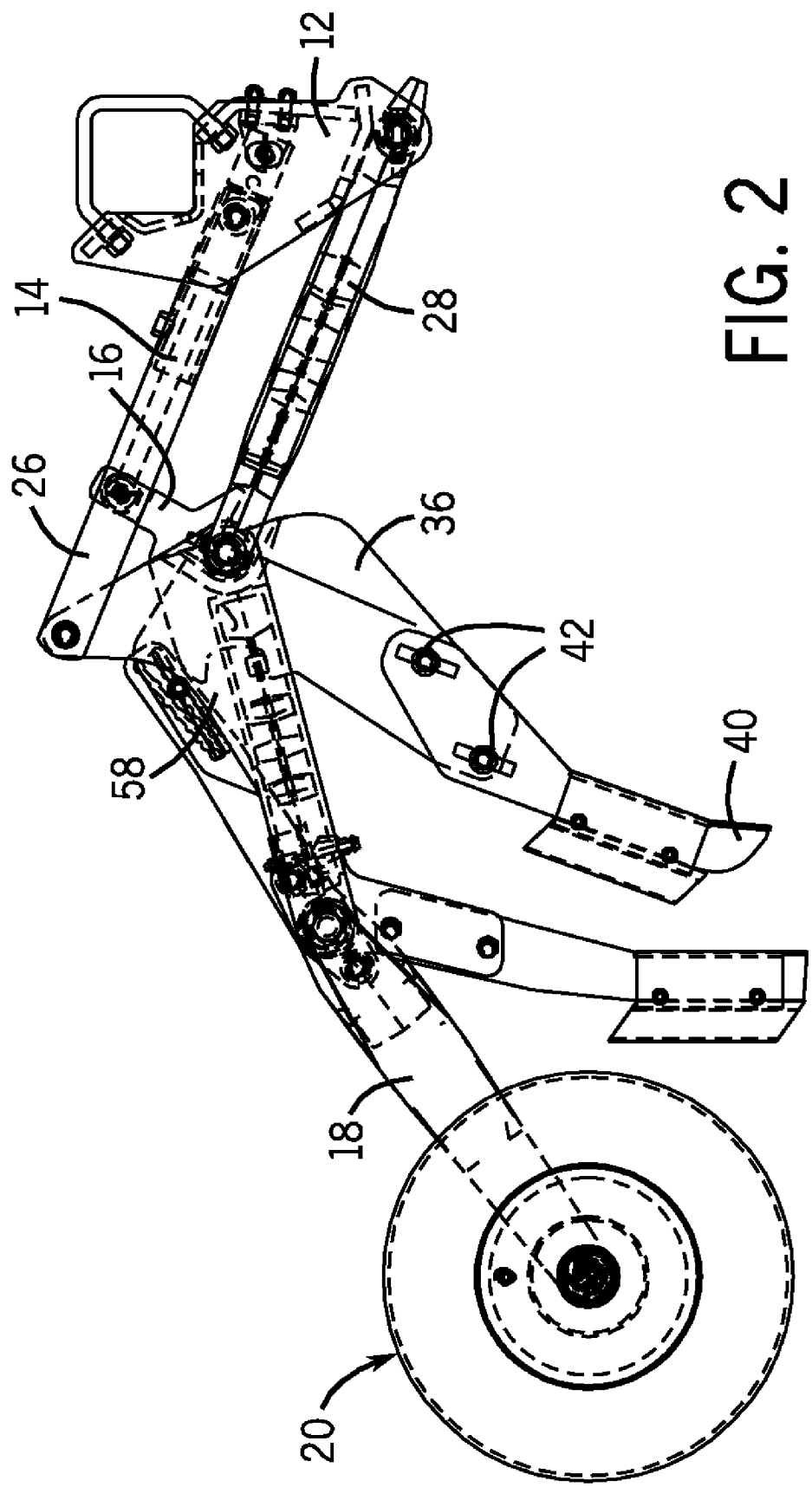
FIG. 2 is a side view of an embodiment of the precision hoe opener of FIG. 1.

FIG. 2 illustrates a side view of an embodiment of the precision hoe opener 10. The figure illustrates the precision hoe opener 10 in the deployed position with first ground engaging tool 40 in an elevated position as compared to packer wheel 20. In the illustrated embodiment, cylinder 14 (shown in hidden lines) causes swing link assembly 16 to rotate about pin 60 and engage shank mount adapter 36, while an obstacle may cause first ground engaging tool 40 to be raised above the plane of packer wheel 20 and second ground engaging tool 50.

Figure 3:
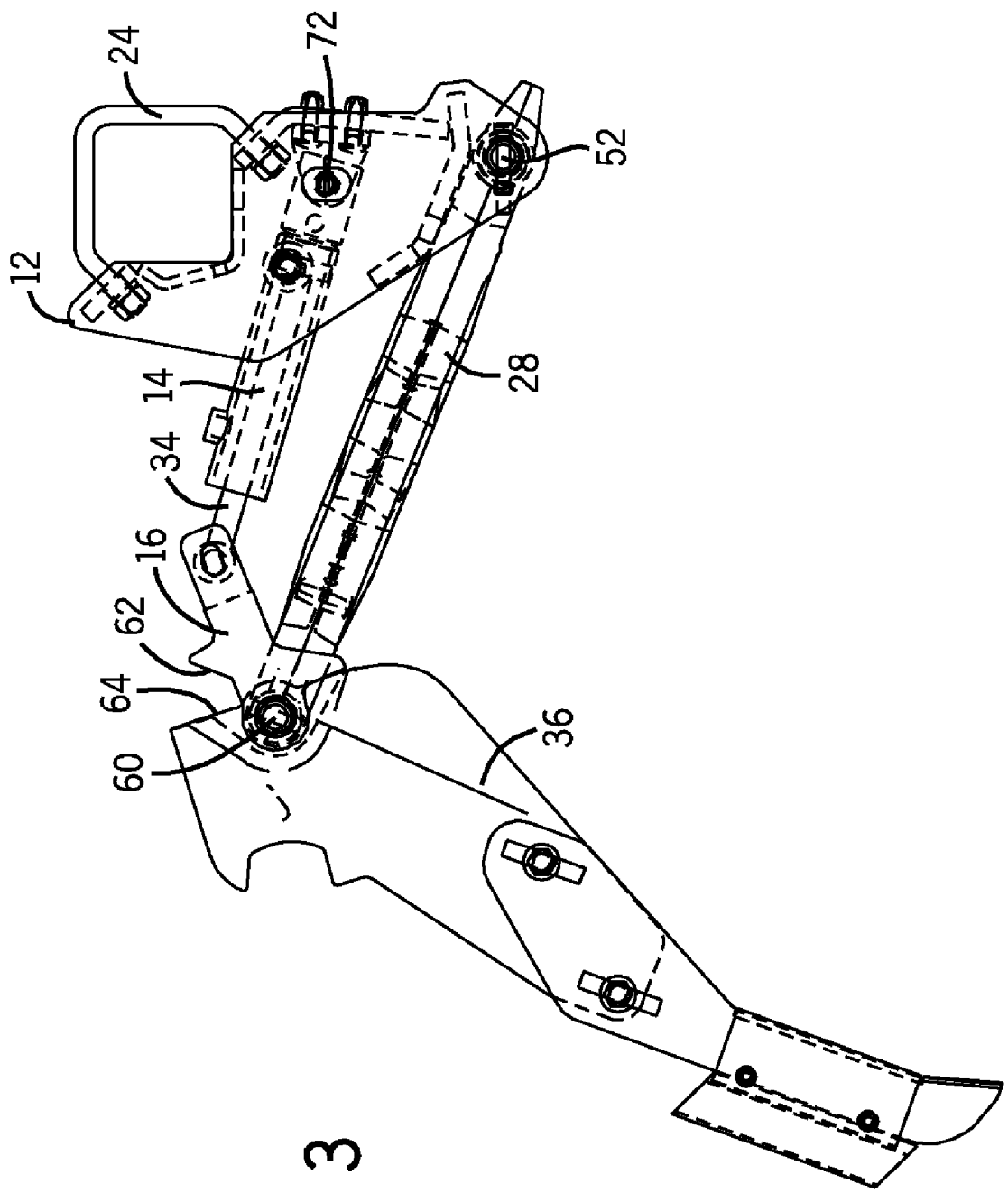
FIG. 3 is a sectional view of an embodiment of the opener assembly of FIGS. 1 and 2, wherein the packer wheel, the rear frame assembly, and certain elements have been removed for clarity.

FIG. 3 illustrates a portion of the precision hoe ground engaging tool 10 with certain features removed for clarity, such as packer wheel 20, packer wheel assembly 18, and first member 26. The figure illustrates the tool frame support 12, cylinder 14, second member 28, swing link assembly 16, and shank mount adapter 36. Further, FIG. 4 is a perspective view of the shank mount adapter 36, swing link assembly 16, and their related elements.

Figure 4:
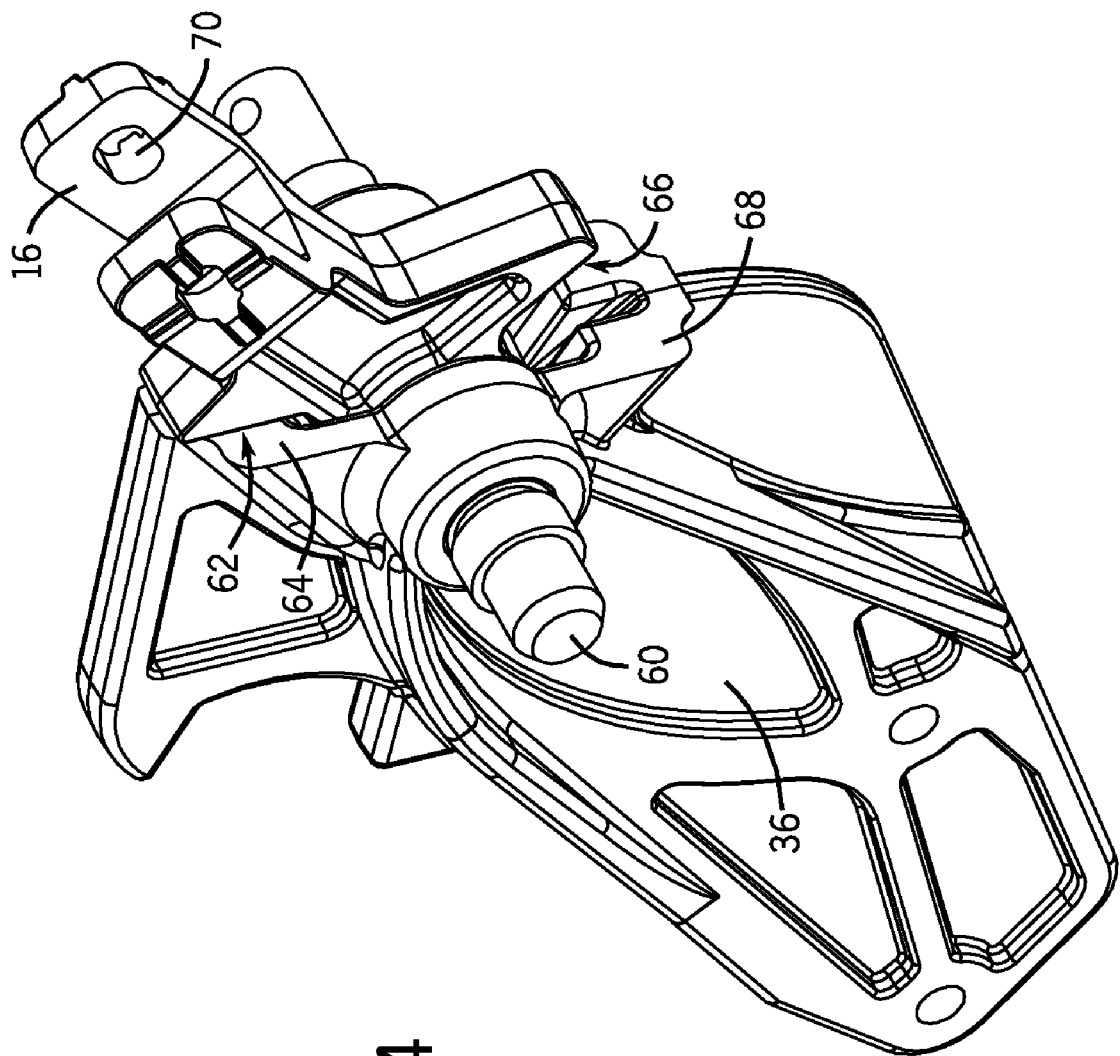
FIG. 4 is a perspective view of an embodiment of the shank mount adapter, the swing link assembly, and associated features as shown in FIG. 3.

Referring to both FIGS. 3 and 4, shank mount adapter 36 includes a main body having a number of features. These features interface the swing link assembly 16 to the shank mount adapter 36 during either retraction or extension of the cylinder 14. The swing link assembly includes extension mating feature 62 that interfaces with extension contact surface 64 as well as retraction feature 66 and surface 68. These features provide greater leverage about pin 60 for cylinder 14, reducing the amount of hydraulic power needed to move the opener assembly.

The swing link assembly 16 may be described as contacting the surfaces of shank mount adapter 36 at the extremities of the angular rotational movement of the swing link assembly 16 in order to raise or lower the shank. As will be appreciated by one skilled in the art, a portion of the angular movement of the swing link assembly 16 may not cause movement of the shank adapter 36. This characteristic may cause the swing link assembly 16 to be referred to a lost motion linkage. Hole 70 provides a mounting location for the end of piston rod 34 in the swing link assembly. Pin 72 is provided for the opposite end of the cylinder 14 to mount to tool frame support 12. Further, when in the extension position, as shown in FIG. 4, a crescent shaped cavity in the adapter rotates as well, engaging a frame stop, located on the rear frame, to provide a lowering force upon the packer wheel assembly. It follows, that when the swing link assembly 16 is in a retraction position, as shown in FIG. 3, the frame stop may provide a lifting force to the packer wheel assembly. The swing link assembly 16 may be described as contacting the surfaces of shank mount adapter 36 at the extremities of the angular rotational movement of the swing link assembly 16.

FIG. 4 shows the swing link assembly 16 in the extension position to engage the shank mount adapter 36 extending the first ground engaging tool 40 and packer wheel assembly 18 generally downward. In this position, extension mating feature 62 engages extension contact surface 64. In the present embodiment, the geometry of swing link assembly 16 reduces the required length for members 26 and 28 necessary to raise and lower opener assembly 10.

Referring back to FIG. 3, the swing link assembly 16 is shown in the retracted position in which the first ground engaging tool 40 is higher than the packer wheel 20. In the illustrated position of FIG. 3, retraction mating feature 66 engages retraction contact surface 68. As shown in both FIGS. 3 and 4, the cylinder 14 and piston rod 34 are not directly coupled to shank mount adapter 36. Instead, the first ground engaging tool 40 is retracted and extended via the swing link assembly 16 engaging and disengaging the shank mount adapter 36.

Figure 5:
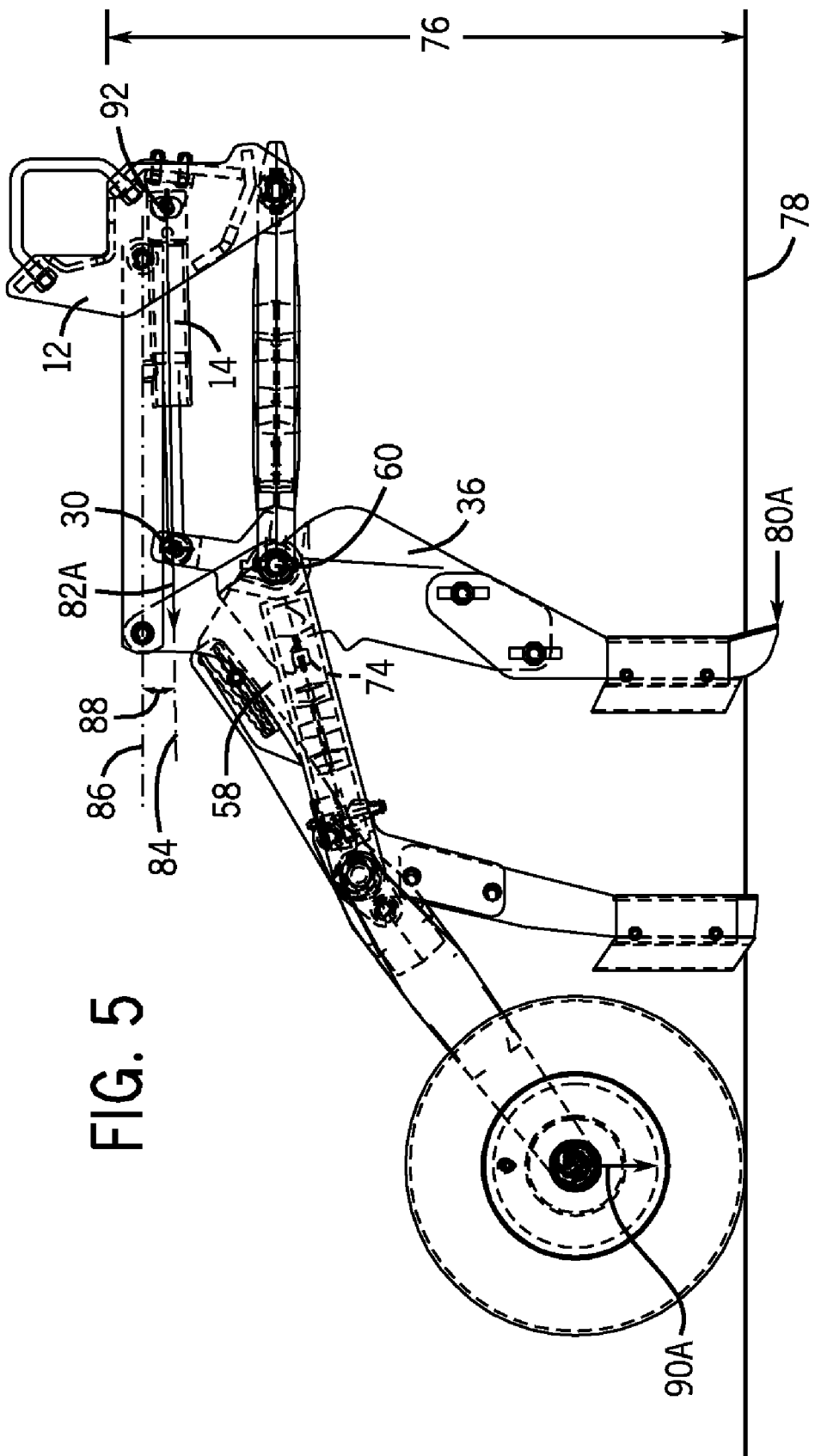
FIG. 5 is a side elevational view of an embodiment of the precision hoe opener as illustrated in FIG. 1, further illustrating a neutral or horizontal operating position to illustrate draft compensation when the assembly is in this operating position.

FIG. 5 illustrates an embodiment of the precision hoe opener 10 in a neutral position as might be representative of being towed during a seeding operation on level ground. In this deployed position for the assembly, shank mount adapter 36 rotates about pin 60 to lower first ground engaging tool 40 and engage frame stop 74 located on rear frame 58. When shank mount adapter 36 rotates about pin 60 and engages the top surface of the frame stop 74, shank mount adapter 36 loads packer wheel assembly 18 which is coupled to rear frame 58. The resulting force applies a load to packer wheel 20 via the multiple linkage assembly.

Further, tool frame support 12 is a nominal distance 76 from terrain 78. During normal operation, first ground engaging tool 40 may plow through terrain 78 creating a draft force 80A on first ground engaging tool 40. In this position, cylinder load 82A is directed along cylinder axis 84. Linkage axis 86 runs through the center of parallel linkage member 28. Numeral 88 represents the small angle between cylinder axis 84 and linkage axis 86. The normal load on packer wheel 20, generally represented by numeral 90A, may mainly consist of the weight of opener assembly 10 with a nominal contribution by cylinder load 82A which is directly related to angle 88. Hydraulic cylinder 14 serves primarily to keep first ground engaging tool 40 in a deployed position and is connected to the assembly by pins 72 and 30.

Figure 6:
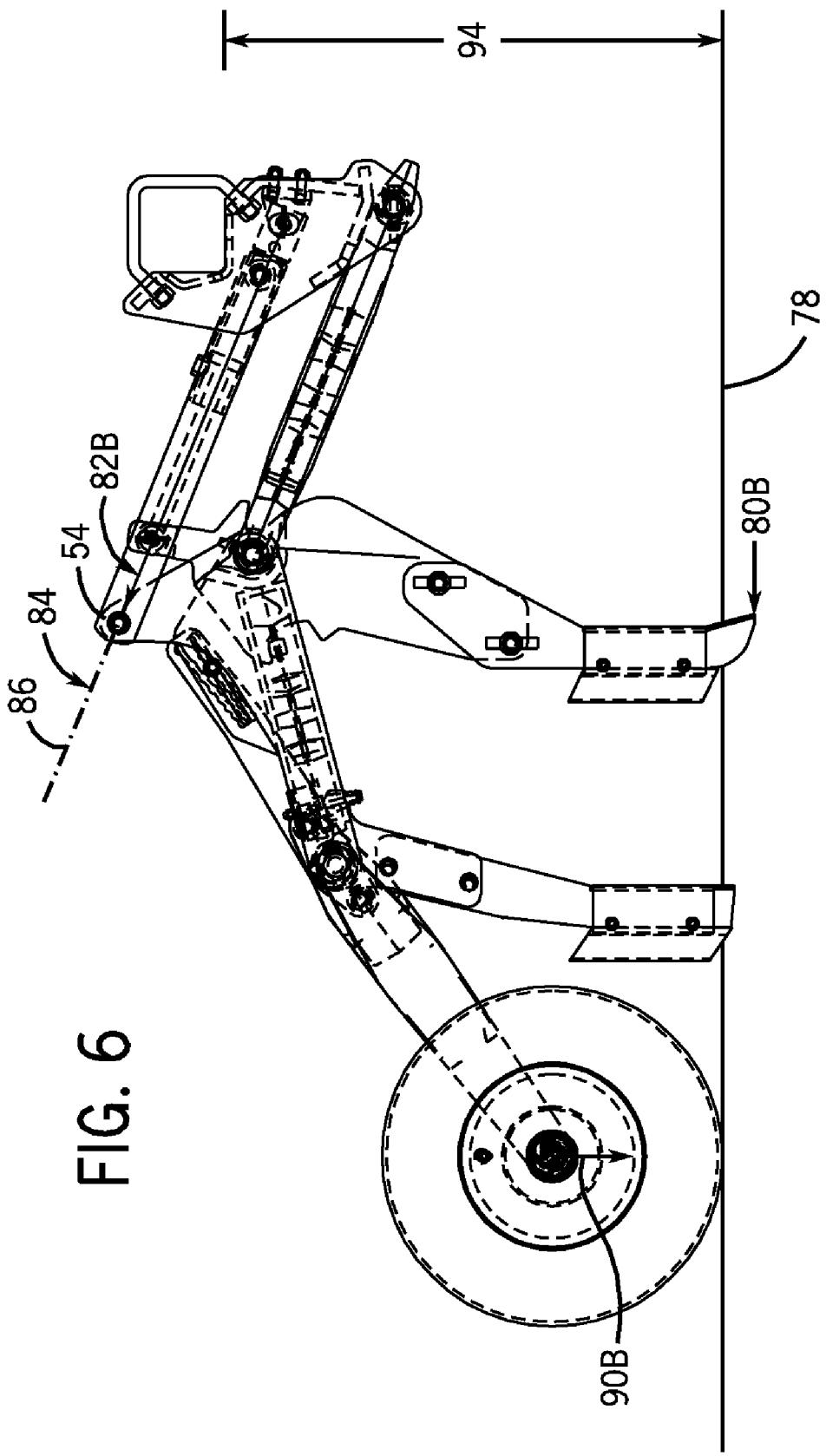
FIG. 6 is a side elevational view of an embodiment of the precision hoe opener as illustrated in FIG. 1, further illustrating a second operating position with the draft compensation loading provided by the cylinder to the packer wheel when the assembly is in this operating position.

FIG. 6 illustrates an embodiment of the precision hoe opener 10 in a second deployed position. In this position, the relative distance between tool frame support 12 and terrain 78 has decreased from that of FIG. 5 and is represented by numeral 94. This decrease in the distance typically occurs during terrain changes. The terrain provides draft force 80B on first ground engaging tool 40, thereby increasing the packing force 90B of the packer wheel 20 on the terrain 78 due to the orientation of the links 26 and 28 relative to the direction of the application of the draft force 80B. In the illustrated embodiment, the orientation of the parallel linkage and cylinder 14 may provide a lifting force to counteract the increased packing force 90B on the packer wheel 20 due to a decrease in angle 88. Specifically, piston load 82B acts along cylinder axis 84 at a reduced angle 88 relative to linkage axis 86 that causes a reduced contribution to force 90B. Cylinder load 82B may produce a resultant force in the opposite direction of packing force 90B, thereby compensating for a portion of the downward force created by the draft force 80B on first ground engaging tool 40.

Figure 7:
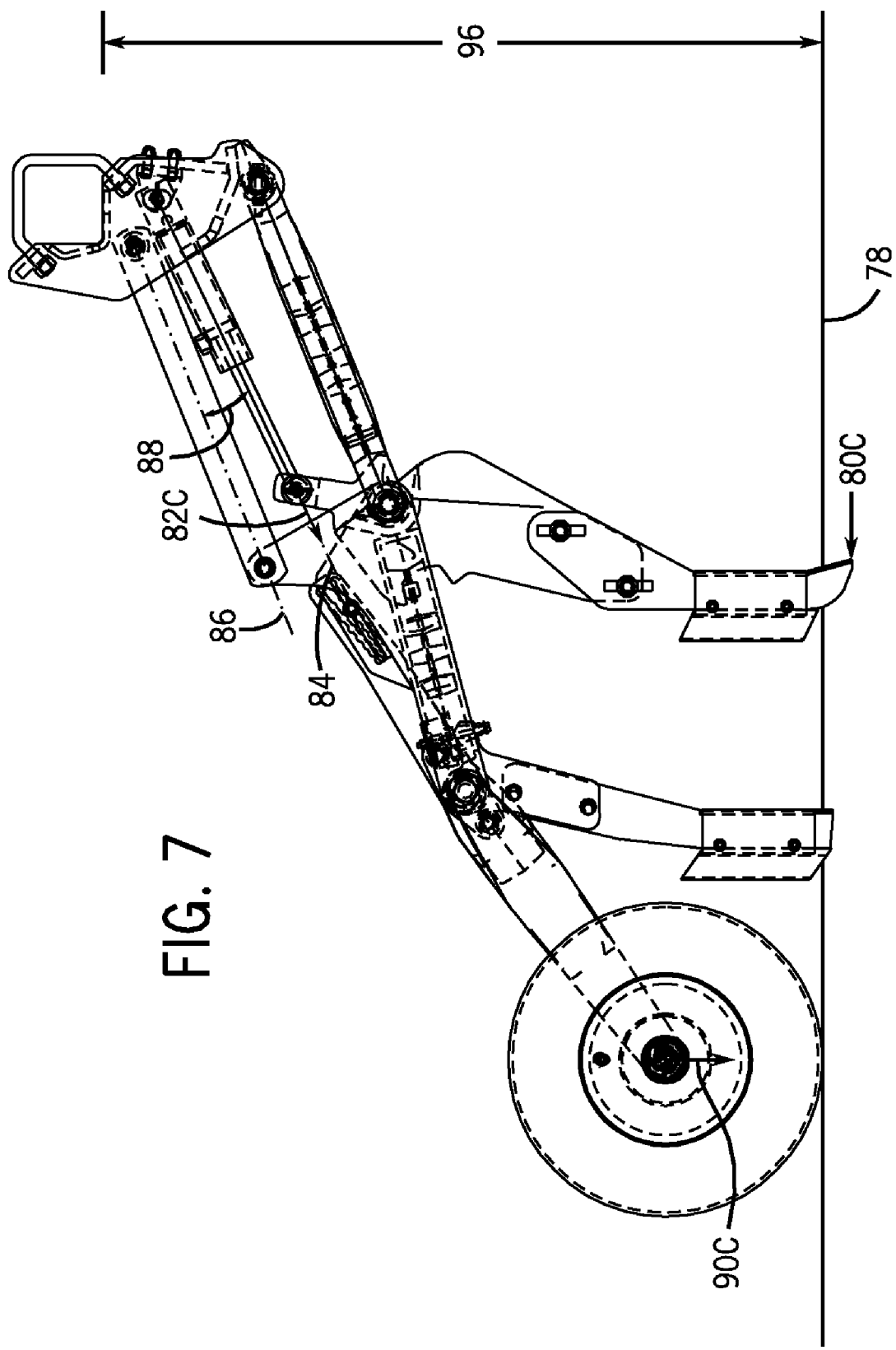
FIG. 7 is a side elevational view of an embodiment of the precision hoe opener as illustrated in FIG. 1, further illustrating a third operating position to illustrate the draft compensation loading provided by the cylinder to the packer wheel when the assembly is in this operating position.

FIG. 7 illustrates an embodiment of the precision hoe opener 10 in a third deployed position. In this illustration, relative distance 96 between tool frame support 12 and terrain 78 has increased relative to FIGS. 5 and 6. As discussed above, this increase may be dependent on the terrain in the field. In this illustration, the relative increase in the distance between tow bar 22 and terrain 78 causes draft force 80C to reduce the packer force 90C on the packer wheel 20 due to the orientation of links 26 and 28 relative to the direction of the draft force 80C. The orientation of the parallel linkage causes the draft force 80C to have an upward, lifting effect on the packer wheel 20. The upward resultant force on the packer wheel 20 decreases the packing force 90C placed on the terrain 78. Optimally, it is desirable to maintain a constant packing force 90C by the packer wheel 20 on the terrain 78 to ensure accurate seeding. As illustrated by the figure, when the relative distance increases, the piston load 82C may act along cylinder axis 84 and the relative angle 88 increases which inturn increases the contribution of the piston load to the packing force 90C, on the packer wheel 20. In other words, the cylinder 14 compensates for the decrease in packing force created by draft force 80C. Further, the angle between cylinder axis 84 and linkage axis 86, represented by numeral 88, is larger than in FIG. 5, causing a substantial downward component to cylinder force 82C to act upon packer wheel 20.

In general, FIGS. 5, 6, and 7 illustrate that the precision opener assembly 10 has an increased range of motion while providing a generally constant packing force to the soil. This is achieved in part by the opener assembly 10 maintaining a substantially constant angle between packer wheel assembly 18 and terrain 78, as well as the geometry of cylinder 14, first member 26, and second member 28.

The disclosed embodiments of precision opener 10 provide control of the packing force 90A, 90B, 90C, and the seeding depth of the first ground engaging tool 40. The opener assembly 10 advantageously responds to variations in the terrain 78, the draft force 80 on the first ground engaging tool 40, the packing force, or a combination thereof. Thus, the opener assembly 10 can provide a generally uniform packing force and seeding depth to improve the overall quality of the seeding process, and in turn improve subsequent growth originating from the seeds. Again, the hoe opener 10 has a variety of adjustment mechanisms to control the location of the packer wheel 20, the first ground engaging tool 40, the optional second ground engaging tool 50, or a combination thereof.

Further detail of the forces acting upon opener assembly 10 is illustrated in FIGS. 8A, 8B, and 8C. FIGS. 5, 6, and 7 correspond to the positions illustrate simplified diagrams of FIGS. 8A, 8B, and 8C, respectively. A neutral position of opener assembly 10 and the corresponding forces are shown in FIG. 8A. In the neutral position, the parallel links are in a substantially horizontal orientation. In the embodiment, draft force 80A is horizontal. Because the links are substantially horizontal, the draft force causes no significant reaction force at the packer wheel. Further, draft force 80A causes no significant component of the force at the packer wheel. Therefore, there is no significant compensating force required from the cylinder force 82A. In general, the vertical component of the cylinder force 82A results in a substantially equal and opposite vertical force at the packer wheel force 98A.

An elevated position of opener assembly 10 and the corresponding forces are shown in FIG. 8B. In the embodiment, horizontal draft force 80B results in a significant downward pull on the parallel linkage, due to the orientation of the linkage arms. This downward pull on the parallel linkage results in a significant component of the packer wheel force 98B to be due to the draft force 80B. In order to keep the packing force constant (i.e., 98B and 98A substantially equal), the component of packer wheel force 98B that is due to the cylinder force 82B is reduced. To compensate for this increase in the component of packer wheel force 98B due to the draft force 80B, the cylinder force 82B is oriented in such a way as to decrease the contribution of force to the packer wheel force 98B. In cases where either the draft force 80B is large or the upward motion of the parallel linkages is large, the orientation of cylinder force 82B may be such that it results in a negative component of the packer wheel force 98B. This compensating force counteracts the downward effect of draft force 80B, meaning that the packing force of the packing wheel remains substantially constant and equal to that of the neutral position.

A lowered position of opener assembly 10 and the corresponding forces are shown in FIG. 8C. In the embodiment, draft force 80C causes a significant upward pull on the parallel linkage in the lowered position. Accordingly, cylinder force 82C is oriented such that its component of the packer wheel force 98C at the packer wheel is increased relative to the neutral position. This increase in the component of packer wheel force 98C due to the cylinder force 82C compensates for and counteracts the upward effect of draft force 80C, meaning that the packing force of the packing wheel remains substantially constant and equal to that of the neutral position. In the present drawings, forces 80A, 80B, and 80C are substantially equal, as are forces 82A, 82B and 82C. As will be appreciated by one skilled in the art, the variable force applied to the packer wheel (98A-98C) is governed solely by the geometry of the parallel linkage, the biasing member and the other support structure components. That is, in the embodiment, the amount of force exerted by hydraulic power supply 32 is not varied and other forces on the support structure do not substantially vary as the opener assembly is towed across a varying terrain. In other words, the substantial cause of the variable force exerted on the packer wheel by the support structure is the position of the parallel linkage, biasing member other support structure components relative to the terrain.

FIG. 9 illustrates the agricultural implement assembly, including precision opener assemblies 10, as row units of a complete agricultural seeder system 100, as may be towed behind a tractor (not shown). As shown in the diagram, the seeder system 100 includes a plurality of opener assembly row units mounted on a frame that includes several tool frame bars which are generally transverse to the direction the seeder system is pulled. As the seeder system 100 is towed across a field with the row units deployed, a plurality of rows of crops may be seeded in each pass.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural system comprising:
    an opener assembly, said opener assembly having a support structure:
    said support structure coupled to a frame comprising a parallel linkage assembly;
    said parallel link assembly includes a forward bracket attached to said frame and a rear bracket; wherein said forward and said rear bracket connected by a first link member and a second link member substantially equal in length;
    a ground engaging assembly extending from said rear bracket wherein said ground engaging assembly contacts a terrain for depositing a plurality of product;
    a packer wheel assembly extending from said rear bracket of the support structure aft of the ground engaging assembly, wherein the packer wheel assembly and ground engaging assembly are vertically moveable relative to said frame as the agricultural system moves across said terrain; wherein said vertical movement of said rear bracket, packer wheel assembly and ground engaging assembly occurs within a working range of said support structure; and
    a biasing member coupled between said front and rear brackets of said parallel linkage assembly; wherein said biasing member is separate from said parallel linkage assembly; wherein the orientation of said biasing member relative to said first and second link member is configured to exert an upward force on said rear bracket, packer wheel assembly and ground engaging assembly when said opener assembly is in upper portion of said working range; wherein the orientation of said biasing member relative to said first and second link member is configured to exert a downward force on said rear bracket, packer wheel assembly and ground engaging assembly when said opener assembly is in lower portion of said working range; wherein said upward force and downward force exerted on said packer wheel assembly by said support structure corresponds to position of said parallel link assembly, said biasing member and said support structure relative to said terrain;
    wherein an angle between the biasing member and the parallel linkage assembly is variable as the distance between the frame and the terrain changes.

2. The system of claim 1, wherein the biasing member comprises a two way biasing member configured to raise and lower the ground engaging assembly by movement of a lost motion linkage.

3. The system of claim 2, wherein the lost motion linkage is configured to apply the variable force to the packer wheel assembly.

4. The system of claim 2, wherein the parallel linkage assembly is configured to maintain a substantially constant orientation of the ground engaging assembly with respect to a frame of the agricultural system.

5. The system of claim 1, wherein the parallel linkage assembly is configured to maintain a constant orientation of the packer wheel assembly with respect to the ground.

6. The system of claim 1, wherein the support structure comprises a shank adapter, the ground engaging assembly being rigidly mounted to the shank adapter.

7. The system of claim 6, wherein the packer wheel assembly is raised by contact with the shank adapter.

8. The system of claim 1, comprising a plurality of opener row units, each including the support structure, the ground engaging assembly, the packer wheel assembly, and the biasing member.

9. A method of manufacturing an agricultural system, the method comprising:
    providing an opener assembly, said opener assembly having a support structure;
    coupling said support structure to a frame, wherein the support structure includes a 4-bar linkage; wherein said 4-bar linkage includes a forward bracket attached to said frame and a rear bracket; wherein said forward and said rear bracket connected by a first link member and a second link member substantially equal in length;

mounting a ground engaging assembly to extend from said rear bracket; wherein said ground engaging assembly contacts a terrain for depositing a plurality of product;

mounting an packer wheel assembly to extend from said rear bracket of the support structure aft of ground engaging assembly, wherein the packer wheel assembly and ground engaging assembly are vertically moveable relative to said frame as the agricultural system moves across said terrain; wherein said vertical movement of said rear bracket, packer wheel assembly and ground engaging assembly occurs within a working range of said support structure; and coupling a biasing member between said front and rear brackets of said 4-bar linkage; wherein said biasing member is separate from said 4-bar linkage assembly; wherein the orientation of said biasing member relative to said first and second link member is configured to exert an upward force on said rear bracket, packer wheel assembly and ground engaging assembly when said opener assembly is in upper portion of said working range; wherein the orientation of said biasing member relative to said first and second link member is configured to exert a downward force on said rear bracket, packer wheel assembly and ground engaging assembly when said opener assembly is in lower portion of said working range;

wherein said upward force and downward force exerted on said packer wheel assembly by said support structure corresponds to position of said parallel link assembly, said biasing member and said support structure relative to said terrain;

wherein an angle between the biasing member and the parallel linkage assembly is variable as the distance between the frame and the terrain changes.

10. The method of claim 9, wherein the support structure includes a shank adapter, the ground engaging assembly being rigidly mounted to the shank adapter.

11. The method of claim 10, comprising a lost motion linkage pivotally mounted to the shank adapter.

12. The method of claim 11, wherein the lost motion linkage contacts the shank adapter at two extremities of the angular range.

13. The method of claim 11, comprising mounting a packer wheel assembly extending from the support structure aft of the ground engaging assembly, the packer wheel assembly being raised by contact with the shank adapter.

14. The method of claim 11, comprising pivotally coupling the biasing member to the lost motion linkage, wherein the biasing member is configured to raise and lower the ground engaging assembly.

15. The method of claim 9, wherein the biasing member comprises a two way biasing member configured to raise and lower the ground engaging assembly by pivotal movement of a lost motion linkage.

* * * * *